United States Patent
Frey et al.

(10) Patent No.: US 6,579,456 B2
(45) Date of Patent: Jun. 17, 2003

(54) METHOD AND DEVICE FOR PRECIPITATING BEVERAGE SEDIMENT

(75) Inventors: Rolf Frey, Geislingen/Steige (DE); Frank Göltenboth, Blaustein (DE); Martin Grupp, Wissgoldingen (DE); Günther Nagel, Donzdorf (DE); Armin Startz, Weidenstetten (DE); Gerhard Wittlinger, Geislingen/Stg. (DE)

(73) Assignee: WMF Wuerttemergische Metallwarenfabrik AG, Geislingen/Steige (DE)

( * ) Notice: Subject to any disclaimer, the term of this patent is extended or adjusted under 35 U.S.C. 154(b) by 84 days.

(21) Appl. No.: 09/850,926

(22) Filed: May 8, 2001

(65) Prior Publication Data
US 2002/0002909 A1 Jan. 10, 2002

(30) Foreign Application Priority Data
May 9, 2000 (DE) .......................................... 100 22 538

(51) Int. Cl.⁷ ........................ B01D 29/085; B01D 35/28
(52) U.S. Cl. .................... 210/255; 210/262; 210/433.1; 210/434; 210/456; 210/474; 210/497.3
(58) Field of Search ................................ 210/255, 262, 210/473, 474, 483, 497.01, 497.3, 433.1, 456, 458, 434

(56) References Cited

U.S. PATENT DOCUMENTS 1,108,365 A * 8/1914 Haselden

FOREIGN PATENT DOCUMENTS

DE 9109901.3 6/1996

* cited by examiner

Primary Examiner—Robert Popovics
(74) Attorney, Agent, or Firm—Marshall, Gerstein & Borun

(57) ABSTRACT

A device and a method are described, which are used for precipitating beverage sediment from the rinsing mixture of beverage production machines and which comprise a rinsing conduit, a sediment receptacle and a filtering means. In order to design a device of this type in a structurally simple manner such that it can be serviced more easily, it is suggested that the filtering means should comprise a first and a second filter which are arranged one after the other when seen in the direction of flow of the rinsing mixture and which are each provided with filtrate discharge means and that a flow connection for the rinsing mixture discharged from the rinsing conduit and for the filter cake precipitated on the first filter should be provided, said flow connection bypassing said first filter and leading into the sediment receptacle.

10 Claims, 2 Drawing Sheets

METHOD AND DEVICE FOR PRECIPITATING BEVERAGE SEDIMENT

FIELD OF THE INVENTION

Background of the Invention

The present invention relates to a method and a device for precipitating a beverage sediment such as used in beverage production machines.

Beverage production machines, such as coffee machines and also e.g. beverage vending machines, which do not process instant powders, are often provided with a cleaning device for rinsing out beverage residues, such as coffee or tea sediments, after each brewing operation. When the rinsed-out residues, such as the exhausted coffee sediment or the exhausted tea leaves, have to be removed from the rinsing liquid, such beverage production machines are normally equipped with a sediment receptacle of the type described e.g. in German Utility Model 91 09 901. Such sediment receptacles have filtering walls through which the filtrate, i.e. the cleaning liquid, can flow off, whereas the beverage sediment remains in the receptacle, where it is collected and from which it can finally be removed and disposed of. In order to reduce the maintenance work, these sediment receptacles are normally large enough for collecting the beverage sediment of at least a plurality of brewing operations. The beverage-sediment filter cake accumulating in the sediment receptacle will therefore become thicker and thicker whereby the filtering process will be slowed down. In addition, it turned out that a sedimentation in the filter cake takes place over a period of repeated cleaning processes, i.e. the finer particles, especially particles of coffee sediment, will accumulate on the surface of the filter cake and slow down the flow through said filter cake to a disproportionally high extent. In extreme cases, it may happen that no filtrate at all flows off and that the sediment receptacle overflows if servicing is delayed for only a short period of time.

SUMMARY OF THE INVENTION

Hence, it is the object of the present invention to provide a device and a method for precipitating beverage sediment from the rinsing mixture of beverage production machines, said device being designed in a structurally simple manner such that it can be serviced more easily.

It turned out that the residence time of the rinsing mixture in the sediment receptacle can be reduced substantially, when the rinsing mixture is filtered in two steps, i.e. when a first sub-amount of filtrate is initially removed from the rinsing mixture in a first filter and when the residual rinsing mixture is then passed through a second filter by means of which the residual, thus concentrated filtrate is precipitated. It turned out that this two-step filtrate precipitation has the effect that, on the one hand, the sedimentation and, consequently, the formation of a blocking layer on the surface of the beverage sediment is avoided and that, on the other hand, the remaining beverage-sediment filter cake is much drier than in the case of the known, one-step precipitation.

It will, for example, be particularly advantageous when the passage opening of the flow connection is provided directly on the first filter.

The rinsing mixture is simultaneously used as a rinsing agent for the first filter, which entrains the filter cake that has accumulated on said first filter, so that said first filter will always remain free.

This rising effect can be improved in cases in which the first filter is implemented as a screen filter when the rinsing conduit terminates in an expedient mode of arrangement with respect to said screen filter.

Instead of a screen filter, it is also possible to use a tubular filter for said first filter; there is also a particularly preferred structural design of a tubular filter.

There is a specially preferred structural design of the second filter.

Finally, an additional cleaning device for said first filter can be provided, said cleaning device preventing clogging of said first filter even in the case of comparatively long off-times.

BRIEF DESCRIPTION OF THE DRAWING

In the following, embodiments of the present invention will be explained in detail making reference to the drawings, in which.

DETAILED DESCRIPTION OF THE REFERRED EMBODIMENT

Figure 1:
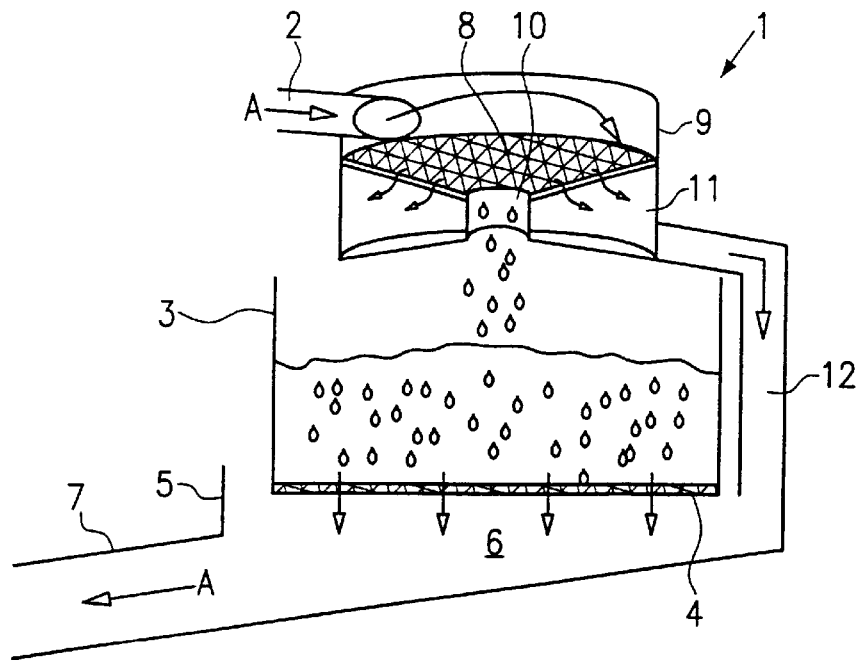
FIG. 1 shows a schematic representation of a first embodiment of the device according to the present invention.

FIG. 1 shows a device 1 for precipitating beverage sediment from the rinsing mixture of a beverage production machine which is not shown, in particular of a coffee machine, a tea urn or a beverage vending machine or the like. In the case of these beverage production machines, which do not process instant powders, the beverage sediment must be removed from the brewing unit after each brewing operation; in some machines this is done by rinsing the brewing unit with water. If necessary, a cleaning agent may be added as well, in particular for basic cleaning. The rinsed-out mixture of water, cleaning agent, if such an agent has been used, and beverage sediment flows via a rinsing conduit 2 into a sediment receptacle 3 which, as is normally the case, can be implemented as a box- or pot-shaped receptacle with at least one filtering wall. In the embodiment shown the sediment receptacle 3 has a filtering base 4; filtering side walls may, however, be provided as well.

The sediment receptacle 3 is, preferably removably, accommodated in a trough 5 in such a way that it can be taken out for removing the beverage-sediment filter cake accumulating in said sediment receptacle 3, and that a sufficiently large free space is formed below the filtering base 4, said free space serving as a filtrate collecting chamber 6 which collects the filtrate passing through the filtering base 4 and discharges it through a filtrate conduit 7.

An additional filter 8 is arranged between the rinsing conduit 2 and the sediment receptacle 3, the liquid flowing first through said filter 8 in the direction of flow. In the embodiment shown, the filter 8 is implemented as a circular screen filter which is accommodated in a filter chamber 9 having cylindrical side walls. The filter has the shape of a funnel with weakly inclined walls (low gradient) and a central opening 10, which allows the rinsing mixture to pass unfiltered from the rinsing conduit 2 into the sediment receptacle 3. The rinsing conduit 2 leads into the filter chamber 9 substantially tangentially to the passage opening 10 and substantially tangentially to the filter 8 and ends substantially on the circumference of the filter 8 in such a way that the flow A discharged from said rinsing conduit 2 flows substantially parallel to the filtering surface of the filter 8 into the filter chamber 9 and in the form of a spiral vortex over said filtering surface of the filter 8 into the passage opening 10.

Below the filter 8 there is a collecting chamber 11 for the filtrate passing through said filter 8, said collecting chamber 11 being connected neither to the passage opening 10 nor to the sediment receptacle 3. The collecting chamber 11 leads via a filtrate conduit 12 into the collecting chamber 6 and from there into the conduit 7.

When a rinsing operation is carried out, the rinsing mixture consisting of the cleaning liquid and the beverage sediment flows via the rinsing conduit 2 tangentially into the filter chamber 9 and from said filter chamber in a spiral flow path transversely across the first filter 8. Part of the liquid of the rinsing mixture already passes through said first filter 8 and is drawn off via the collecting chamber 11 and the conduit 12. The residual rinsing mixture with the filter cake on the first filter 8, which is entrained very well by the spiral flow, flows then as a concentrated mixture through the passage opening 10 into the sediment receptacle 3, where the final precipitation of the beverage sediment from the cleaning liquid takes place via the second filter in the form of the filtering base 4 (or the filtering side walls).

Figure 2:
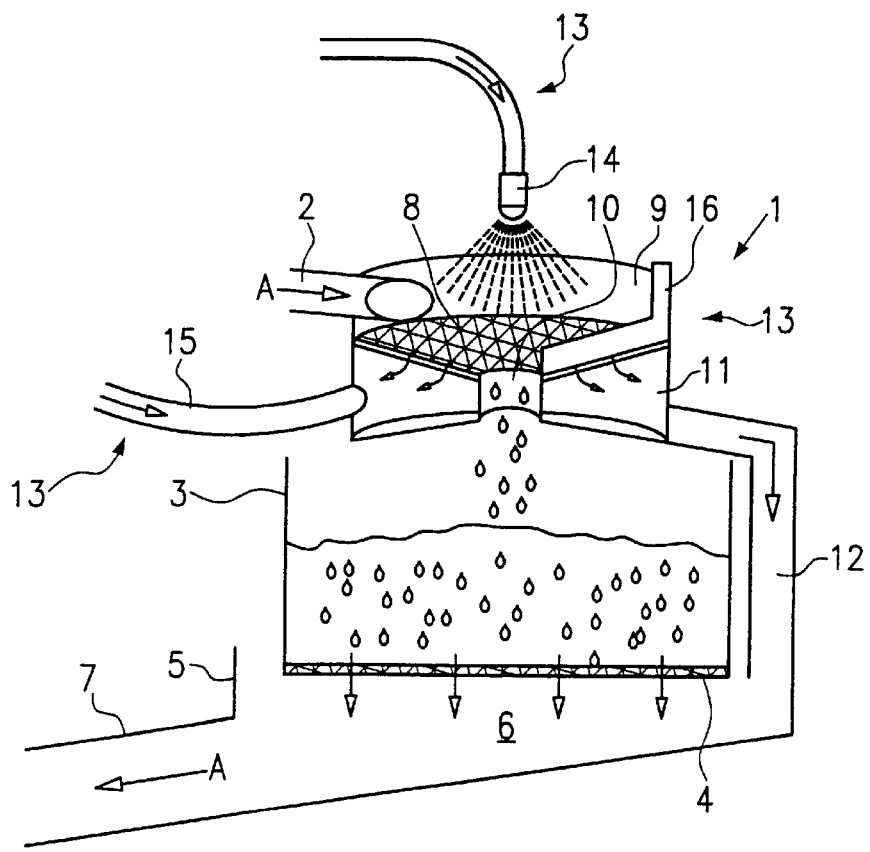
FIG. 2 shows the embodiment according to FIG. 1 with additional rinsing possibilities that may be provided.

In beverage production machines in the case of which it cannot be excluded that comparatively long off-times occur between two rinsing operations, a further cleaning device 13 (FIG. 2) for the filtering surface of the first filter 8 can be provided to be on the safe side. With the aid of this cleaning device 13, beverage sediment which has not been fully flushed down into the sediment receptacle 3 in the preceding rinsing operation can be removed from the filtering surface of the first filter 8 so that it will not dry on said filtering surface and be redissolved before the next rinsing operation begins. This cleaning device 13 may have a great variety of different structural designs. Said cleaning device 13 may, for example, be provided with a spray nozzle 14 which is arranged in front of the first filter 8 in the direction of flow A of the rinsing mixture and which is oriented such that the jets discharged from said spray nozzle 14 sweep over the whole filter 8. If necessary, cleaning liquid, e.g. water, is introduced by the spray nozzle 14, said cleaning liquid cleaning the filter 8.

The cleaning device 13 may also include a backwash conduit 15 which ends in the collecting chamber 11 and through which cleaning liquid, e.g. water, can be conducted into said collecting chamber 11 with sufficient pressure or at a sufficient flow rate in such a way that said cleaning liquid will be pressed from the filtrate chamber 11 through the filter 8 in a direction opposite to the direction of flow A and will then be discharged through the passage opening 10.

The cleaning device 13 may also be provided with a mechanical wiper 16 including e.g. a wiper blade which is conducted across the filtering surface 8 at predetermined time intervals.

The spray nozzle 14, the backwash conduit 15 or the wiper 16 are preferably provided alternatively, but they may also be used in combination.

Figure 3:
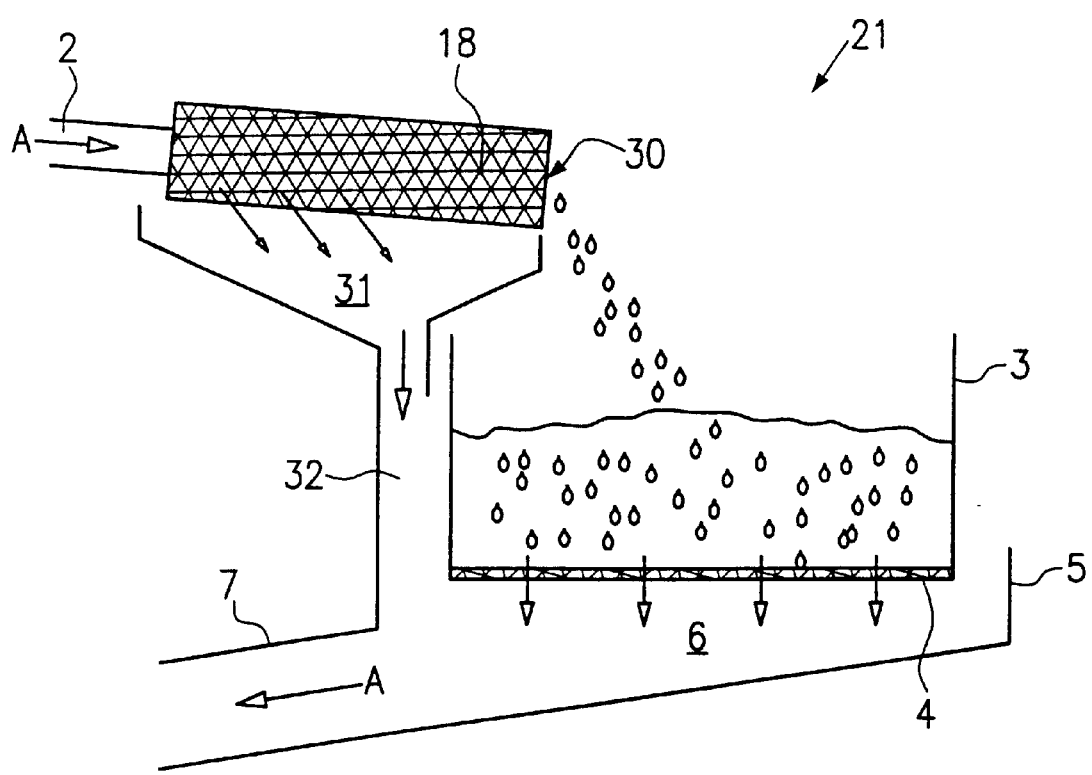
FIG. 3 shows a schematic representation of a second embodiment of the device according to the present invention.

FIG. 3 shows a further embodiment of a device 21 according to the present invention used for precipitating beverage sediment from the rinsing mixture of beverage production machines. The components of the device 21 which are identical or comparable with the components of the device 1 are designated by the same reference numerals and are not explained once more.

The rinsing conduit 2 of said device 21 opens into an open end face of a first filter implemented as a tubular filter 18 whose second open end face defines a passage opening 30 leading into the sediment receptacle 3. The filtering periphery of said filter 18 communicates with a filtrate collecting chamber 31 leading via a separate conduit 32 into the collecting chamber 6 and from there into the conduit 7. The aligned central axes of the lower area of the rinsing conduit 2 and of the tubular filter 18 shown in said figure are preferably slightly inclined (low gradient) so that the flow will not tear, without excessively high flow rates being obtained. The rinsing mixture flows from the rinsing conduit 2 into the first filter 18 in a direction of flow extending, transversely to the filtering means, parallel to the filtering wall of the tubular filter 18, a first precipitation of filtrate taking place through the wall of the tubular filter 18 and the thus precipitated filter cake being entrained by the flow. The filtrate is draw off via the collecting chamber 31 and the conduits 32 and 7. The thickened rinsing mixture flows through the passage opening 30 into the sediment receptacle 3 where further water is removed therefrom, as has also been described in connection with the first embodiment.

Modifying the embodiments described and shown in the drawings hereinbefore, it will also be possible to use filters having a different structural design, with or without passage openings, as first filters. It would, for example, be possible to use a planar screen filter in the embodiment according to FIG. 1 and to provide the point where the rinsing conduit ends in the filter chamber and the passage opening at opposite sides of the filter chamber. Also the structural design of the sediment receptacle may be adapted to the respective requirements. An additional cleaning device, e.g. a backwash conduit or a wiper, can also be provided in the case of the embodiment according to FIG. 3.

We claim:

1. A device for precipitating beverage sediment from the rinsing mixture of beverage production machines, comprising in combination a rinsing conduit, a sediment receptacle and a filtering means, said filtering means having a first and a second filter (4, 8, 18) which are arranged one after the other when seen in the direction of flow (A) of the rinsing mixture, each said first and second filter provided with filtrate discharge means (6, 11, 12, 31, 32), the second filter being provided as at least one filtering wall (4) of said sediment receptacle (3), and a flow connection (12, 30) for the rinsing mixture discharged from said rinsing conduit (2) and for beverage sediment precipitated on said first filter (8, 18), the flow connection bypasses said first filter (8, 18) and leads into said sediment receptacle (3).

2. A device according to claim 1, wherein said flow connection comprises a passage opening (10, 30) for the rinsing mixture, said passage opening being provided on said first filter (8, 18).

3. A device according to claim 2, wherein said first filter (8) is a screen filter and that said rinsing conduit (2) is substantially parallel to the filtering surface.

4. A device according to claim 3, wherein said screen filter is provide with a through hole defining said passage opening (10), and that said filtering surface between said rinsing conduit and said passage opening (10) has a gradient.

5. A device according to claim 4, wherein said rinsing conduit (2) terminates tangentially to said passage opening (10).

6. A device according to claim 5, wherein said first filter (8) is arranged in a filter chamber (9), implemented as a screen filter and provided with a central said passage opening (10), said rinsing conduit (2) terminates tangentially into said filter chamber (9), and said passage opening (10) communicates with said sediment receptacle, the area located outside of said passage opening (10) and below said first filter (8) communicating with filtrate discharge means (11, 12).

7. A device according to claim 1, wherein said flow connection comprises a flow path for the rinsing mixture, said flow path extending transversely across the filtering surface of said first filter (8, 18).

8. A device according to claim 1, wherein said first filter (18) is a tubular filter.

9. A device according to claim 8, wherein said tubular filter (18) has one of its end faces connected to said rinsing conduit (2) whereas the opposite end face thereof is provided with a said passage opening (30).

10. A device according to claim 1, wherein a cleaning device (13) for said first filter (8, 18) is provided.

* * * * *

UNITED STATES PATENT AND TRADEMARK OFFICE
CERTIFICATE OF CORRECTION

PATENT NO. : 6,579,456 B2
DATED : June 17, 2003
INVENTOR(S) : Rolf Frey et al.

It is certified that error appears in the above-identified patent and that said Letters Patent is hereby corrected as shown below:

Column 4,
Line 58, please delete "provide" and insert -- provided --.
Line 60, please insert -- (2) -- after "rising conduit".

Signed and Sealed this

Twenty-second Day of March, 2005

JON W. DUDAS
*Director of the United States Patent and Trademark Office*